(No Model.)
E. PECKHAM.
CAR WHEEL.
No. 376,721. Patented Jan. 17, 1888.
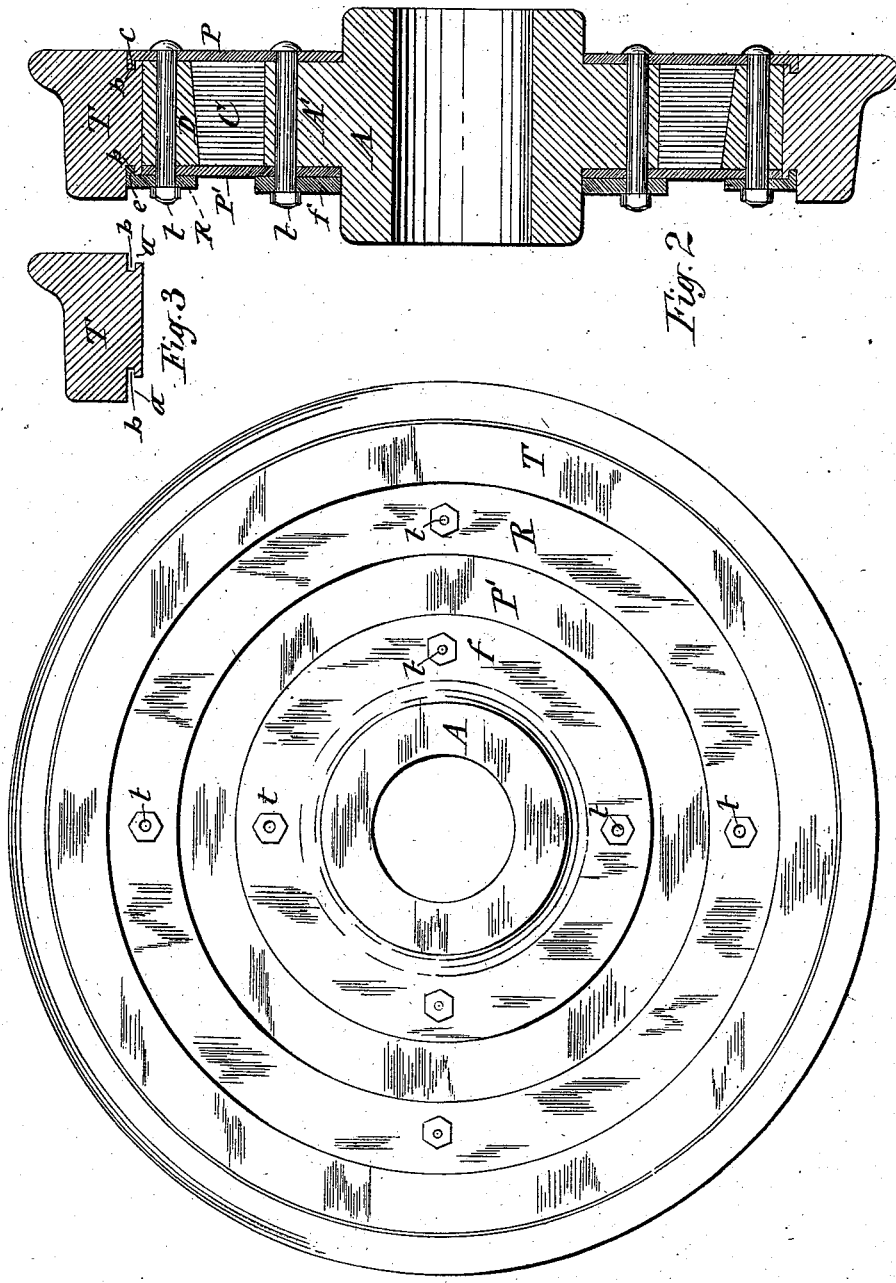

UNITED STATES PATENT OFFICE.

EDGAR PECKHAM, OF SYRACUSE, NEW YORK, ASSIGNOR TO THE PECKHAM CAR WHEEL COMPANY, OF NEW YORK.

CAR-WHEEL.

SPECIFICATION forming part of Letters Patent No. 376,721, dated January 17, 1888.

Application filed November 7, 1887. Serial No. 254,485. (No model.)

*To all whom it may concern:*

Be it known that I, EDGAR PECKHAM, of Syracuse, in the county of Onondaga, in the State of New York, have invented new and useful Improvements in Car-Wheels, of which the following, taken in connection with the accompanying drawings, is a full, clear, and exact description.

This invention relates to the class of car-wheels which are provided with a paper or non-metallic core; and the invention consists in improved means for locking the tire on the wheel-body, as hereinafter fully explained, and specifically pointed out in the claim.

In the accompanying drawings, Figure 1 is a face view of the outer side of the wheel. Fig. 2 is a transverse section of the same, and Fig. 3 is a detached transverse sectional view of the tire.

Similar letters of reference indicate corresponding parts.

A represents the hub of the wheel, formed with the circumferential enlargement A', upon which the non-metallic core C is seated.

D denotes the outer ring of the wheel-body, between which ring and the aforesaid enlargement A' of the hub the core C is confined by the plates P P', secured to opposite sides of the aforesaid parts by bolts or rivets $t\,t$, passing through the side plates, P P', and through the ring D and part A' of the hub. The plate P, I provide with an additional support by a collar, $f$, applied to the exterior of said plate adjacent to the hub of the wheel, and secured in position by the bolts or rivets $t\,t$ passing through said collar.

T represents the tire, which is formed with rabbets $a\,a$ at opposite edges of its inner peripheral face and with inward grooves $b\,b$ in said rabbets. The side plate P projects over the periphery of the ring D or wheel-body and into the rabbet $a$ of the tire, and is formed with a circumferential lateral flange, $c$, which enters into the groove $b$. The other side plate, P', abuts with its outer periphery against the inner periphery of the tire, and upon the exterior of the said plate is placed a ring, R, which projects over the outer periphery of the plate P' and into the rabbet $a$, and is formed with a circumferential lateral flange, $e$, entering into the groove $b$ of the tire, the ring R being secured in its position by the bolts or rivets $t\,t$ passing through it.

The described wheel is more particularly designed for engine-trucks, and the advantages derived from the described construction and combination of parts are the following: The side plate P, being secured to the hub and directly interlocked with the tire, forms a substantial tie for holding the tire on the wheel-body. The ring R being removable from the wheel-body, and the side plate P' at the same side of the wheel terminating at the inner periphery of the tire, allows the tire to be applied to and removed from the wheel-body by removing said ring and slipping the tire on or off from the wheel-body at the aforesaid side thereof. The portion of the tire which is interlocked with the flange of the ring R is braced by the abutment of the plate P' against the inner periphery of the tire.

What I claim as new, and desire to secure by Letters Patent, is—

In combination with the wheel-body and the tire formed with the circumferential rabbets $a\,a$ and inward groove $b\,b$ in said rabbets, the side plate P, projecting over the periphery of the wheel-body and formed with a flange, $c$, entering one of the grooves $b$, the side plate P', abutting against the inner periphery of the tire, the ring R, applied to the exterior of the plate P' and projecting over the outer periphery thereof, and formed with the flange $d$, entering into the adjacent groove $a$ of the tire, and bolts or rivets $t\,t$, tying the ring R and the plate P on opposite sides of the wheel-body, as set forth.

In testimony whereof I have hereunto signed my name, in the presence of two witnesses, at Syracuse, in the county of Onondaga, in the State of New York, this 15th day of October, 1887.

EDGAR PECKHAM. [L. S.]

Witnesses:
 HOWARD P. DENISON,
 C. L. BENDIXON.